Oct. 15, 1940.　　A. D. GARRISON ET AL　　2,218,025
METHOD OF TREATING A WELL
Filed June 10, 1938
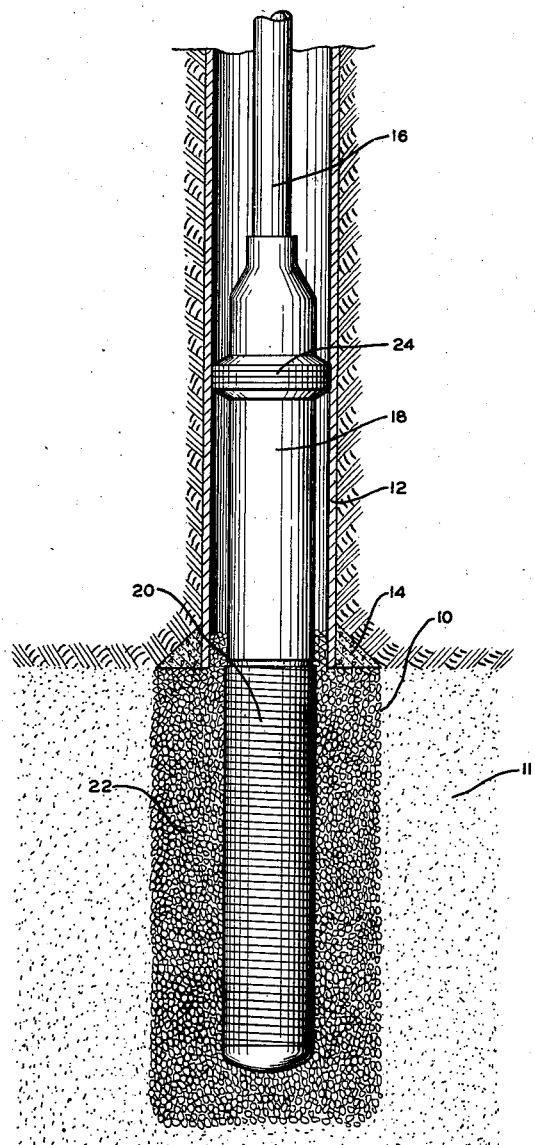
ALLEN D. GARRISON
CHARLES F. TEICHMANN
INVENTORS
BY R. J. Dearborn
Daniel Stryker
ATTORNEYS Patented Oct. 15, 1940

2,218,025

UNITED STATES PATENT OFFICE 2,218,025

METHOD OF TREATING A WELL

Allen D. Garrison, Houston, and Charles F. Teichmann, Beaumont, Tex., assignors to The Texas Company, New York, N. Y., a corporation of Delaware Application June 10, 1938, Serial No. 212,973

18 Claims. (Cl. 166—21)

This invention relates to a method of increasing the production of a well, and more particularly to a method of graveling a well by forming a filter pack in the producing zone of the well through which pack the liquid such as oil to be produced will flow. The principal object of the invention is to filter pack a well in such a manner that the oil will flow preferentially through the interstitial capillary openings in the pack while the flow of water through these openings will be retarded.

In the United States Letters Patent No. 2,024,119, issued December 10, 1935, to W. V. Vietti and A. D. Garrison, a method of treating an oil well is disclosed in which a chemical precipitate is deposited on the water-wet sand adjacent the well so as to render the sand less permeable to water without retarding the flow of oil to the well. This method of treating a well has proven very satisfactory in increasing the flow of oil with respect to the flow of water.

When a well is being produced from an oil sand, a large amount of sand and silt usually enters the flow string through perforations of the screen, and the cutting action of the sand on the metal screen soon wears the screen away, thus leaving larger openings therein through which increasingly larger quantities of sand, silt and detritus may enter the flow string. If the screen perforations are small enough to hold back the sand, the latter frequently clogs up the perforations, thus decreasing materially the effective area of the screen. To remedy this situation wells are frequently packed with gravel or other granular material in a manner such that a bed or pack of the sub-divided material will be formed around the screen, this producing an effective filter bed through which the oil flows to the screen. The gravel holds back much of the sand and consequently a screen having larger perforations with an attendant greater flow of oil, can be used. The gravel also serves to support the formation or walls of the well and to prevent the same from crumbling into the well cavity about the screen with an obviously detrimental effect.

In accordance with the present invention, the filter pack of granular material comprising the filter bed around the screen is formed or treated in such a manner as to be oil-wettable but water-repellent. The grains of the filter pack, being oil-wettable, are preferentially wetted by oil, and when the filter pack is given equal access to oil and water the interstitial spaces between the grains of the filter pack become lined with a film of oil and the flow through the capillaries will be predominantly oil because of the high interfacial tension between the oil lining the capillaries and the water. It has been found that the size of the granular material constituting the filter pack must be in the range where the interstitial spaces are of capillary size, and preferably in the range of from 20 to 30 mesh up to 60 mesh.

In carrying out the invention in one form, certain solids which are preferentially oil-wettable, which may be sub-divided to the proper size and which have sufficient mechanical strength, are used as the filtering material. Among the solids having this property are certain of the metallic sulfides such as galena or pyrites, coal, spent fuller's earth or other adsorbents which have become spent in the liquid or vapor phase treatment of petroleum oils. Sub-divided solids having carbonized surfaces and sub-divided solids having oil-wettable but water-repellent coatings can be used effectively.

The oil-wettable, water-repellent material is sub-divided in any suitable manner and is then placed in the well as by circulating it in reverse circulation with a carrier fluid such as drilling mud, in which case the filter material will be deposited in the well cavity around the screen, while the carrier fluid will pass through the screen and upwardly to the surface through the flow string. The filter material may, if desired, be circulated into the well through the flow string or tubing by direct circulation so that it will pass outwardly from the bottom of the tubing string into the well cavity where it will be deposited to form a pack around the screen, the carrier fluid then being returned to the surface through the space between the tubing string and the well wall or casing. Any other suitable method of placing the filter material in the well may be used, such as dumping the material into the well at the surface and causing it to drop or sink to the producing formation so as to form a pack or filter bed at the proper place. Since the filter particles are oil-wettable but water-repellent, oil will flow preferentially through the interstitial capillaries between the particles, and will thus reach and pass into the screen through the perforations therein. At the same time because of the high interfacial tension between the oil filming the walls of the capillaries and water, the flow of the water will be materially retarded and, consequently, the amount of water produced with the oil will be greatly reduced below that which would otherwise be produced from the water-wet oil sand.

The single figure of the drawing illustrates a well having an enlarged cavity 10 in a producing zone 11, and a casing 12 which is preferably cemented in place as at 14. The well is provided with a flow or tubing string 16 at the lower end of which is disposed a liner 18 having a perforated or screen portion 20. The cavity 10 is filled with the gravel-like material 22 by any suitable method as has been described hereinbefore. After the gravel 22 has been placed in the cavity a suitable packer 24 is positioned on the liner 18 so as to fill the space between the liner and the casing 12. As has been stated previously, the surfaces of the gravel 22 which forms the filter pack around the screen 20 are such as to repel or retard the flow of water through the pack without retarding the flow of oil from the formation 11 to the screen 20.

In carrying out the invention in another form, sand or other granular material, which is not per se oil-wettable and water-repellent, may be treated prior to being placed in the well, by a material such as a water and oil insoluble metal salt of a sulphonated compound selected from the group consisting of sulphonated oils, fats and fatty acids so as to coat the granular particles, as is disclosed in the aforementioned Letters Patent No. 2,024,119, the coating having the property of rendering the granular particles oil-wettable but repellent to water. It has been found that the heavy metal salts, including those of calcium, barium, iron, manganese, zinc, tin, lead and the like, of sulphonated oils, fats or fatty acids, as well as natural fats such as tallow, olein, stearin and the like, which have been sulphonated by treatment with sulphuric acid, are suitable for treating the gravel or granular particles. Likewise, sulphonated acids formed by sulphonating stearic, palmitic and oleic acids are included. A very satisfactory and comparatively cheap material, which is a by-product of the petroleum industry, is the sulphonic sludge acid derived from the treating of petroleum oil with sulphuric acid. These various materials may be conveniently employed in the form of their water-soluble alkali metal salts, and the gravel or granular material to be treated is immersed in or sprayed or otherwise coated with a solution of the soluble salt. The gravel is then coated with a solution of a water-soluble calcium, barium, or other heavy metal salt such as a chloride, nitrate or other soluble salt of the heavy metals, which reacts with the first mentioned solution to produce a precipitate of the heavy metal salt of the sulphonated oil, fat or fatty acid. For purposes of description, the salts of calcium, barium, and other alkaline earth metals are included under the expression "heavy metal salt" along with the salts of such metals as iron, manganese and the like which are more familiarly understood as heavy metals. For economical reasons, calcium chloride is preferred for this purpose inasmuch as it constitutes a cheap and readily available material which is frequently produced as a by-product in connection with oil and salt production.

After treatment in this manner, the granular or filter material can be placed in the well by means of any one of the methods already described, and the resulting filter pack will allow oil to pass into the well screen while holding back the water, as has been previously described.

Other materials which have been found highly effective as coating films to render sand or gravel particles preferentially oil-wettable are water and oil insoluble metallic sulphides, such as disclosed in the co-pending application of Allen D. Garrison (D#18,718) filed of even date herewith. These include sulphides of heavy metals, which sulphides do not hydrolyze in slightly acid water, such as the sulphides of lead, copper, cadmium, cobalt, iron, mercury, molybdenum, nickel, tin, silver, zinc, arsenic, antimony and the like. The coating may be formed on the gravel to be used for the pack by first applying an oil solution of a heavy metal soap such as lead oleate, and then applying an oil solution of a sulphide compound such as hydrogen sulphide, to cause a precipitation of the heavy metal sulphide in the form of a film coating about the gravel particles.

Another oil-wettable coating which is satisfactory for purposes of the present invention is a water and oil insoluble bitumen or asphalt, such as a sulphurized asphalt, or a highly air-blown and oxidized asphalt, as disclosed in the co-pending application of Allen D. Garrison (D#17,738) filed of even date herewith. This may be applied in the form of an aromatic or chlorinated aliphatic solution, such as a xylene or carbon tetrachloride solution, to build up a coating on the gravel; or precipitation of the oil insoluble bitumen or asphalt may be facilitated by applying oil to the gravel wet with the solution.

Again the gravel may be coated by applying to the gravel a non-aqueous oil-miscible solution of a water and oil insoluble constituent or salt of a sulphonated oil, fat or fatty acid as disclosed in the co-pending application of Allen D. Garrison (D#18,646) filed of even date herewith. For example, a xylene extract of the aluminum salt of a sulphonated mixture of a mineral oil and benzol, and a xylene extract of petroleum acid sludge, have been found highly satisfactory.

Instead of treating the granular material before placing the same in the well, a filter pack or filter bed formed of ordinary granular material having a particle size of from about 20 mesh down to about 60 mesh may be treated after it has been placed in the well. It may be desirable to treat a pack which has been in use for some considerable time, or it may be found desirable to form a new gravel pack in the well and then to treat the pack so as to render it preferentially oil-wettable and water-repellent. To this end, any one of the chemical solutions previously mentioned may be circulated into the well, either by direct or reverse circulation, so as to pass through the gravel and to deposit an oil-wettable coating thereon. If desired, the pack may first be washed or flushed with an aqueous alkaline solution to disperse clay particles from the interstices of the gravel. After the oil-wettable coating has been placed on the gravel, the remaining chemical may be removed from the well by bailing or by forcing it upwardly and out of the well by means of some suitable circulating medium, such as drilling mud or oil.

It has also been found very effective to treat or coat both the gravel pack and the producing oil sands in the well with a material to render them oil-wettable and water-repellent. The oil sand could be treated first by any one of the methods disclosed in the applications filed concurrently herewith in the name of Allen D. Garrison, after which the well would be gravel packed with a material formed or coated so as to be oil-wettable and water-repellent, or the gravel could be placed in the well first and then both the gravel and the oil sands treated in the manner described. The proper sequence will of course depend upon the method of gravel packing employed, the type of oil sand being treated, and various other factors which are obvious.

When a solid, oil-wettable, water-repellent material or a natural granular material which has been treated in accordance with this method is used, the capillary spaces or interstices in the filter pack will contain a lining of oil. The flow through the capillary spaces is predominantly oil and due to the high interfacial tension between the oil and the water, the flow of water is greatly reduced or prevented. If any water is produced, it is in the form of isolated droplets or fine threads.

Obviously many modifications and variations of the invention, as hereinbefore set forth, may be made without departing from the spirit and scope thereof, and therefore only such limitations should be imposed as are indicated in the appended claims.

We claim:

1. The method of completing an oil well having a perforated well screen which comprises placing in the well at the producing zone a filter pack of a granular, oil-wettable, water-repellent material of a size such that the interstitial spaces are of capillary dimensions.

2. The method of completing an oil well having a perforated well screen in a cavity in the oil producing zone, which comprises filling said cavity about the screen with an aggregate of a subdivided oil-wettable, water-repellent material the particles of which have a size between twenty and sixty mesh.

3. The method of completing an oil well having a perforated well screen in a cavity in the oil producing zone, which comprises filling said cavity about the screen with a pack of a subdivided solid material having carbonized surfaces and possessing the property of being preferentially wettable by oil but repellent to water.

4. The method of increasing the ratio of oil to water in the production of an oil well which comprises placing and maintaining in the well at a predetermined depth a pack of particles of subdivided material the surface of which is capable of being wet by oil but which is repellent to water, the interstitial spaces of the pack being of capillary size.

5. The method of increasing the production of oil from a well with respect to the amount of water produced from the well, which comprises placing and maintaining in said well in the producing zone a body of gravel-like material of from twenty to sixty mesh, the surfaces of said material being oil-wettable but water-repellent so that oil will flow readily through the interstices in said body while water will be held back due to the increased adhesion tension of the material for oil and the decreased adhesion tension of the material for water.

6. The method of completing an oil well having a perforated well screen which comprises placing around said screen a filter pack of a granular, oil-wettable, water-repellent metallic sulphide.

7. The method of completing an oil well having a perforated well screen in a cavity in the oil producing zone, which comprises filling said cavity about the screen with an aggregate of a subdivided oil-wettable, water-repellent material such as an adsorbent which has become spent in the liquid or vapor phase treatment of petroleum oils and the particles of which have a size of between twenty and sixty mesh.

8. The method of completing an oil well having a perforated well screen in a cavity in the oil producing zone, which comprises filling the cavity about said screen with a pack of spent fuller's earth.

9. The method of completing an oil well having a perforated well screen which comprises placing and maintaining in the well around said screen a filter pack of gravel-like material, the surfaces of which have been coated with a water and oil insoluble asphalt and the interstitial spaces of the pack being of capillary size.

10. The method of completing an oil well having a perforated well screen in a cavity in the oil producing zone, which comprises filling the cavity about said screen with a filter pack of gravel-like material coated with a non-aqueous, oil-miscible solution of a water and oil insoluble constituent of a sulphonated oil, the interstitial spaces of the pack being of capillary size.

11. The method of increasing the ratio of oil to water in the production of an oil well which comprises treating gravel-like material with a substance capable of rendering the surfaces of said material oil-wettable and water-repellent and then placing said treated material in the well cavity in the producing zone so that oil can enter the well through the interstices in the material while the passage of water through said interstices will be retarded.

12. The method of increasing the ratio of oil to water in the production of an oil well which comprises coating gravel-like material of a size between twenty and sixty mesh with a water and oil insoluble metal salt of a sulphonated compound selected from the group consisting of sulphonated oils, fats and fatty acids and then placing said coated material in the well cavity in the producing zone so that oil can enter the well through the interstices in the material while the passage of water through said interstices will be retarded.

13. The method of increasing the ratio of oil to water in the production of an oil well which comprises coating a subdivided material with a precipitate of a heavy metal salt of a sulphonic acid derived from the treating of petroleum oil with sulphuric acid, and then placing said coated material in the well cavity in the producing zone so that oil can enter the well through the interstices in the material while the passage of water through said interstices will be retarded.

14. The method of increasing the ratio of oil to water in the production of an oil well which comprises treating a subdivided, gravel-like material with a precipitate of a calcium sludge sulphonate derived by precipitating with a calcium salt a sulphonic sludge acid resulting from the treatment of petroleum oil with sulphuric acid, and then placing said treated material in the well cavity in the producing zone so that oil can enter the well through the interstices in the material while the passage of water through said interstices will be retarded.

15. The method of increasing the ratio of oil to water in the production of an oil well which comprises placing a bed of a gravel-like material in the cavity of the well formed in the producing oil sands and then treating said gravel-like material and the oil sands in the vicinity of the well cavity with a substance capable of rendering the gravel-like material and the oil sands oil-wettable and water-repellent.

16. The method of increasing the ratio of oil to water in the production of an oil well which comprises treating gravel-like material with a substance capable of rendering the surfaces of said material oil-wettable and water-repellent, treating the oil producing sands in the vicinity of the well cavity in the producing zone with a substance capable of rendering said sands oil-wettable and water-repellent, and then placing the treated gravel-like material in the well cavity so that oil can enter the well through the sands and the gravel-like material while the passage of water through the sands and said material will be retarded.

17. A filter pack of a granular material whose surfaces are water and oil insoluble and which have the property of remaining oil-wettable and water-repellent in the presence of both oil and water, the particles of said material having a size between twenty and sixty mesh.

18. A filter pack of a granular material whose surfaces are coated with a water and oil insoluble asphalt and which coated surfaces have the property of remaining oil-wettable and water-repellent in the presence of both oil and water, said pack having interstitial spaces of capillary size.

ALLEN D. GARRISON.
CHARLES F. TEICHMANN.

DISCLAIMER 2,218,025.—*Allen D. Garrison*, Houston, and *Charles F. Teichmann*, Beaumont, Tex.
METHOD OF TREATING A WELL. Patent dated October 15, 1940. Disclaimer filed April 12, 1944, by the assignee, *The Texas Company*.

Hereby enters this disclaimer to claims 1, 2, 4, 5, 11, 15. and 17 in said specification.

[*Official Gazette May 9, 1944.*]